United States Patent
Takayanagi

(10) Patent No.: US 11,559,179 B2
(45) Date of Patent: Jan. 24, 2023

(54) SELF-PROPELLED PATHOGEN DETECTION DEVICE, PATHOGEN DETECTION SYSTEM, AND CONTROL METHOD

(71) Applicant: Panasonic Intellectual Property Management Co., Ltd., Osaka (JP)

(72) Inventor: Tetsuya Takayanagi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 322 days.

(21) Appl. No.: 16/810,180

(22) Filed: Mar. 5, 2020

(65) Prior Publication Data
US 2020/0196812 A1    Jun. 25, 2020

Related U.S. Application Data

(63) Continuation of application No. PCT/JP2018/038238, filed on Oct. 15, 2018.

(30) Foreign Application Priority Data

Nov. 28, 2017   (JP) .............................. JP2017-228158

(51) Int. Cl.
*A47L 7/00*   (2006.01)
*G01N 1/22*   (2006.01)
(Continued)

(52) U.S. Cl.
CPC .......... *A47L 7/0061* (2013.01); *G01N 1/2202* (2013.01); *G01N 15/0205* (2013.01);
(Continued)

(58) Field of Classification Search
CPC . A47L 7/0061; A47L 2201/04; G01N 1/2202; G01N 15/0205; G01N 21/53;
(Continued)

(56) References Cited

U.S. PATENT DOCUMENTS

2005/0022330 A1   2/2005  Park et al.
2012/0223216 A1*  9/2012  Flaherty ............... G05D 1/0242
                                                     901/1
(Continued)

FOREIGN PATENT DOCUMENTS

CN    102203587 A  *  9/2011  ............. G01N 15/02
JP    7-103536         4/1995
(Continued)

OTHER PUBLICATIONS

International Search Report of PCT application No. PCT/JP2018/038238 dated Jan. 8, 2019.

*Primary Examiner* — Adam R Mott
(74) *Attorney, Agent, or Firm* — McDermott Will & Emery LLP

(57) ABSTRACT

The present disclosure provides a self-propelled pathogen detection device in which a place where a pathogen is highly likely to be present in a space such as an inside of a facility is allowed to be configured preferentially to be a target region of detection. The self-propelled pathogen detection device according to the present disclosure comprises a housing; a detection part for detecting a pathogen; a movement mechanism for moving the housing; a position acquirement part for acquiring position information representing a current position of the housing in a space; and a control part which determines a target region in the space on the basis of traffic line information on a person in the space, and controls the movement mechanism to move the housing in the target region on the basis of the position information. The detection part detects the pathogen in the target region.

10 Claims, 10 Drawing Sheets

(51) Int. Cl.
    *G01N 15/02*    (2006.01)
    *G01N 21/53*    (2006.01)
    *G05D 1/02*     (2020.01)
    *G01N 15/00*    (2006.01)

(52) U.S. Cl.
    CPC ........... *G01N 21/53* (2013.01); *G05D 1/0219* (2013.01); *A47L 2201/04* (2013.01); *G01N 2001/2223* (2013.01); *G01N 2015/0088* (2013.01); *G05D 2201/0215* (2013.01)

(58) Field of Classification Search
    CPC ... G01N 2001/2223; G01N 2015/0088; G05D 1/0219; G05D 2201/0215
    See application file for complete search history.

(56) References Cited

U.S. PATENT DOCUMENTS

| | | | |
|---|---|---|---|
| 2014/0309835 | A1  | 10/2014 | Yamamoto |
| 2018/0194006 | A1* | 7/2018  | Gu ........................ B25J 11/0085 |
| 2018/0196430 | A1* | 7/2018  | Sakurai ................ G05D 1/0223 |

FOREIGN PATENT DOCUMENTS

| | | | |
|---|---|---|---|
| JP | 9-296941        |   | 11/1997 |
| JP | 2004-283479     |   | 10/2004 |
| JP | 2005-046592     |   | 2/2005  |
| JP | 2013-148246     |   | 8/2013  |
| JP | 2013-223531     |   | 10/2013 |
| JP | 2014-095532     |   | 5/2014  |
| JP | 2014168824 A  * |   | 9/2014  |
| JP | 2014-209293     |   | 11/2014 |
| JP | 2015-178993     |   | 10/2015 |
| JP | 2016-039843     |   | 3/2016  |
| JP | 2016-206876     |   | 12/2016 |
| WO | WO-2016024419 A1 * | 2/2016 | ............... A61L 9/01 |

* cited by examiner

SELF-PROPELLED PATHOGEN DETECTION DEVICE, PATHOGEN DETECTION SYSTEM, AND CONTROL METHOD

BACKGROUND

1. Technical Field

The present disclosure relates to a self-propelled pathogen detection device, a pathogen detection system, and a control method.

2. Description of the Related Art

An air purifier is used for the purpose of improving indoor air quality. For example, Patent Literature 1 discloses a self-propelled ion generator for the purpose of deodorization.

CITATION LIST

Patent Literature

Patent Literature 1: Japanese Patent Application Publication No. 2013-148246
Patent Literature 2: Japanese Patent Application Publication No. 2015-178993

SUMMARY

By the way, in facilities where people gather, such as care facilities, hospitals, and cram schools, it is possible to detect a pathogen such as an influenza virus at an early stage and deactivate the detected pathogen to prevent infection spread of the pathogen.

The present disclosure provides a self-propelled pathogen detection device in which a place where a pathogen is highly likely to be present in a space such as an inside of a facility is allowed to be configured preferentially to be a target region of detection.

The self-propelled pathogen detection device according to one aspect of the present disclosure comprises:
a housing;
a detection part for detecting a pathogen;
a movement mechanism for moving the housing;
a position acquirement part for acquiring position information representing a current position of the housing in a space; and
a control part, in operation, which
determines a target region in the space on the basis of traffic line information on a person in the space; and
controls the movement mechanism to move the housing in the target region on the basis of the position information; and
wherein
the detection part is capable of detecting the pathogen in the target region.

Note that these comprehensive or specific aspects may be realized by a system, a method, an integrated circuit, a computer program, or a recording medium such as a computer-readable CD-ROM. These comprehensive or specific aspects may be realized by any combination of the system, the method, the integrated circuit, the computer program, and the recording medium.

In the self-propelled pathogen detection device according to the present disclosure, a place where a pathogen is highly likely to be present in a space such as an inside of a facility is allowed to be configured preferentially to be a target region of detection.

Figure 1:
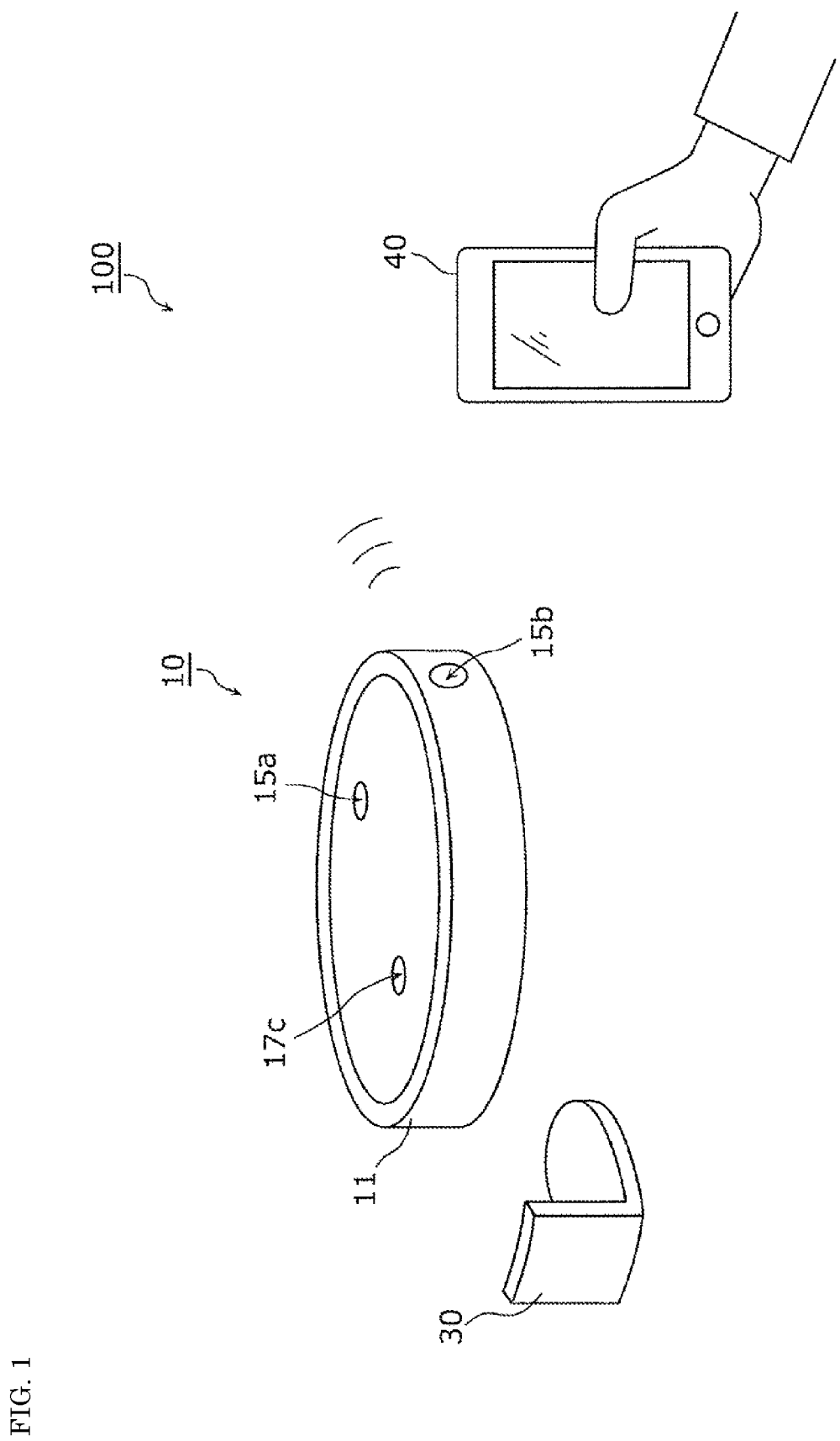
FIG. 1 is a diagram showing an outline of a pathogen detection system according to an embodiment.

DETAILED DESCRIPTION OF THE EMBODIMENT (Finding that Establishes the Fundamentals of the Present Disclosure)

A conventional air purifier targets pollen, mold, fungi, or aerosols such as PM2.5, and perform sterilization and removal of the aerosols with a filter or by ion generation. Such an air purifier is usually set down at a place such as a corner of a room or a place near a window. On the other hand, in addition to such a stationary air purifier, a self-propelled air purifier such as the self-propelled ion generator described in Patent Literature 1 has been developed.

However, when the above-mentioned stationary air purifier or self-propelled air purifier is used to deactivate infectious viruses in facilities where people gather, such as care facilities, hospitals, or cram schools, it is impossible to increase efficiency.

For example, an influenza virus, which is one example of an infectious virus, is scattered by an infected person's cough or sneeze. In other words, the influenza virus originates from a place where the infected person is present. For this reason, in order to deactivate the influenza virus, it is very important to consider information on human behavior patterns or traffic lines of a person who is in the facility.

In addition, if the infectivity of the virus is high, there is a high possibility that a person present in the region surrounding the infected person will be infected in a short time after the infected person has scattered the virus. Therefore, if the virus is not deactivated in a short time, it may lead to mass infection. Since the self-propelled ion generator described in Patent Literature 1 is intended for deodorization, such an infection situation of the virus is not considered.

The present disclosure has been made in view of the above circumstances, and provides a self-propelled pathogen detection device for detecting a pathogen such as an influenza virus at an early stage and deactivating the detected pathogen.

The self-propelled pathogen detection device according to the present disclosure comprises:

a housing;

a detection part for detecting a pathogen;

a movement mechanism for moving the housing;

a position acquirement part for acquiring position information representing a current position of the housing in a space; and a control part, in operation, which determines a target region in the space on the basis of traffic line information on a person in the space; and controls the movement mechanism to move the housing in the target region on the basis of the position information; and wherein the detection part is capable of detecting the pathogen in the target region.

Such a self-propelled pathogen detection device can detect a pathogen, using a region in which a person is often present as a target region on the basis of the traffic line information on the person. The region in which a person is often present is, in other words, a region where pathogens discharged from people are often present. Accordingly, in the self-propelled pathogen detection device, a place where a pathogen is highly likely to be present in a space is allowed to be configured preferentially to be the target region of detection.

In addition, for example, the self-propelled pathogen detection device further comprises a human detecting sensor for detecting presence or absence of the person while the housing moves in the space. The traffic line information on the person includes the number of times that the presence of the person has been detected by the human detecting sensor in each of a plurality of unit regions in a case where the space is divided into the plurality of the unit regions.

Such a self-propelled pathogen detection device can detect a pathogen, using, as the target region, the region where the number of the times that the person has been detected on the basis of the traffic line information on the person is large. Accordingly, in the self-propelled pathogen detection device, a place where a pathogen is highly likely to be present in a space is allowed to be configured preferentially to be the target region of detection.

Further, for example, the control part selects more preferentially, as the target region, the unit regions that have a greater number of times that the presence of the person has been detected by the human detecting sensor.

Such a self-propelled pathogen detection device can detect a pathogen, using, as the target region, the region where the number of the times that the person has been detected on the basis of the traffic line information on the person is large. Accordingly, in the self-propelled pathogen detection device, a place where a pathogen is highly likely to be present in a space is allowed to be configured preferentially to be the target region of detection.

In addition, for example, the self-propelled pathogen detection device further comprises a storage part. The control part stores, in the storage part, the position information when the presence of the person is detected with the human detecting sensor as person detection position information. The control part updates the traffic line information on the person on the basis of the person detection position information.

Such a self-propelled pathogen detection device can change the target region, depending on the change in the traffic line information on the person.

In addition, for example, the self-propelled pathogen detection device further comprises a cleaning part for conducting a cleaning treatment for deactivating the pathogen.

Such a self-propelled pathogen detection device can deactivate the pathogen in addition to the detection of the pathogen.

In addition, for example, the cleaning treatment is to spray a hypochlorous acid aqueous solution.

Such a self-propelled pathogen detection device can deactivate the pathogen by spraying the hypochlorous acid aqueous solution.

In addition, for example, the detection part further detects a concentration of the pathogen, and the cleaning part changes a content of the cleaning treatment, depending on the concentration of the detected pathogen.

Such a self-propelled pathogen detection device can deactivate the pathogen in a short time by increasing the amount of the hypochlorous acid aqueous solution to be sprayed per unit time with an increase in the concentration of the detected pathogen, even if the concentration of the pathogen is high.

Further, for example, the control part controls the movement mechanism to stop the housing at a detection position where the pathogen has been detected by the detection part, and the cleaning part conducts the cleaning treatment in a state where the cleaning part has stopped at the detection position.

Such a self-propelled pathogen detection device can improve the certainty of the deactivation of the pathogen by performing the cleaning treatment in the stopped state.

In addition, for example, the cleaning part continues the cleaning treatment until a concentration of the pathogen detected by the detection part is lower than a predetermined concentration; and the control part controls the movement mechanism to cause the housing to move from the detection position, if the concentration of the pathogen detected by the detection part is lower than the predetermined concentration.

Such a self-propelled pathogen detection device can improve the certainty of the deactivation of the pathogen by performing the cleaning treatment until the concentration of the pathogen becomes low.

The pathogen detection system according to one aspect of the present disclosure comprises:

a self-propelled pathogen detection device; and a control terminal, wherein the self-propelled pathogen detection device comprises a housing;

a detection part for detecting a pathogen;

a movement mechanism for moving the housing;

a position acquirement part for acquiring position information representing a current position of the housing in a space, a control part for controlling the movement mechanism; and a first wireless communication part;

the control terminal comprises:

a terminal control part for selecting, as a target region, at least one unit region from a plurality of unit regions in the space on the basis of traffic line information on a person in the space; and a second wireless communication part for transmitting information representing the selected target region to the first wireless communication part;

the control part controls the movement mechanism on the basis of the position information to cause the housing to move in the selected target region represented by the information received by the first wireless communication; and the detection part detects the pathogen in the target region.

Such a pathogen detection system can detect a pathogen, using a region in which a person is often present as a target region on the basis of the traffic line information on the person. The region in which a person is often present is, in other words, the region where pathogens discharged from people are often present. Accordingly, in the self-propelled pathogen detection system, a place where a pathogen is highly likely to be present in a space is allowed to be configured preferentially to be the target region of detection.

The control method according to one aspect of the present disclosure is a control method for a self-propelled pathogen detection device, the method comprising:

acquiring position information representing a current position of the self-propelled pathogen detection device in a space, selecting, as a target region, at least one unit region from a plurality of unit regions in the space on the basis of traffic line information on a person in the space;

causing the self-propelled pathogen detection device to move in the selected target region on the basis of the position information; and causing the self-propelled pathogen detection device to detect a pathogen when the self-propelled pathogen detection device is present in the target region.

According to such a control method, the self-propelled pathogen detection device can detect a pathogen, using a region in which a person is often present as a target region on the basis of the traffic line information on the person. The region in which a person is often present is, in other words, the region where pathogens discharged from people are often present. Accordingly, in the self-propelled pathogen detection device, a place where a pathogen is highly likely to be present in a space is allowed to be configured preferentially to be the target region of detection.

Note that these comprehensive or specific aspects may be realized by a device, a system, a method, an integrated circuit, a computer program, or a recording medium such as a computer-readable CD-ROM. These comprehensive or specific aspects may be realized by any combination of the device, the system, the method, the integrated circuit, the computer program, and the recording medium.

Hereinafter, the embodiment will be specifically described with reference to the drawings. It should be noted that the embodiment described below shows a comprehensive or specific example. Numerical values, shapes, materials, constituent elements, arrangement positions and connection forms of constituent elements, steps, and order of steps which will be shown in the following embodiment are merely examples, and are not intended to limit the present disclosure. In addition, among the constituent elements in the following embodiment, constituent elements that are not described in the independent claims representing the highest concept are described as optional constituent elements.

Embodiment

[Schematic Configuration]

Figure 2:
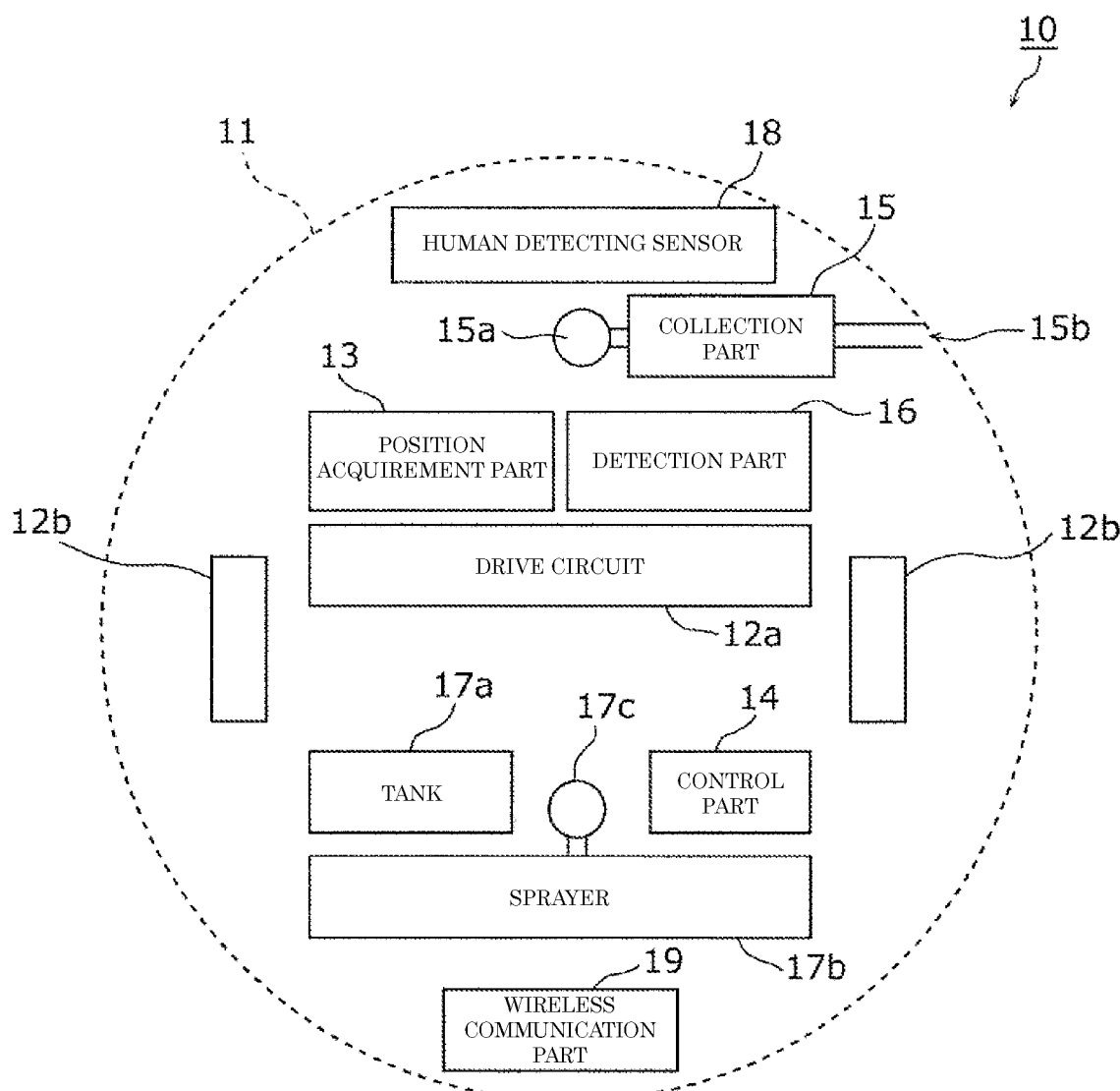
FIG. 2 is a diagram schematically illustrating an internal structure of a self-propelled pathogen detection device according to the embodiment.

First, a schematic configuration of the pathogen detection system according to the embodiment will be described. FIG. 1 is a diagram showing an outline of the pathogen detection system according to the embodiment. FIG. 2 is a diagram schematically illustrating an internal structure of the self-propelled pathogen detection device according to the embodiment. In FIG. 2, only main constituent elements are illustrated.

A pathogen detection system 100 is a system for detecting a pathogen in an indoor space where people gather. An example of the indoor space is a care facility, a hospital, or a cram school. In other words, the indoor space is a flat space. As shown in FIG. 1, the pathogen detection system 100 comprises a self-propelled pathogen detection device 10, a charger 30, and a control terminal 40.

The self-propelled pathogen detection device 10 can move in a self-propelled way by rotating a pair of wheels 12b arranged at the lower part of a housing 11 to move to an arbitrary place, similarly to a robot cleaner. In addition, the self-propelled pathogen detection device 10 detects whether or not a pathogen is contained in the air that enters the inside of the housing 11 from an intake port 15a and is discharged to the outside of the housing 11 from an exhaust port 15b. The self-propelled pathogen detection device 10 stops, if a pathogen is detected, and performs a cleaning treatment for deactivating the pathogen at the location where the pathogen has been detected. Specifically, the self-propelled pathogen detection device 10 sprays a hypochlorous acid aqueous solution from a spray port 17c as a cleaning treatment. Thereby, the self-propelled pathogen detection device 10 can suppress spread of infection of the pathogen.

The self-propelled pathogen detection device 10 operates using a storage battery unit (not shown in FIGS. 1 and 2) as a power source, and the charger 30 charges the storage battery unit.

In addition, the self-propelled pathogen detection device 10 can also detect a pathogen by moving everywhere in a space such as a room in a facility; however, in order to detect a pathogen early and deactivate the detected pathogen, it is necessary to preferentially select, as a target region of detection, a place where a pathogen is highly likely to be detected. In the pathogen detection system 100, the target region that is considered highly likely to contain a pathogen is determined on the basis of traffic line information on a person in the space, and the self-propelled pathogen detection device 10 is caused to move preferentially in the target region.

Figure 3:
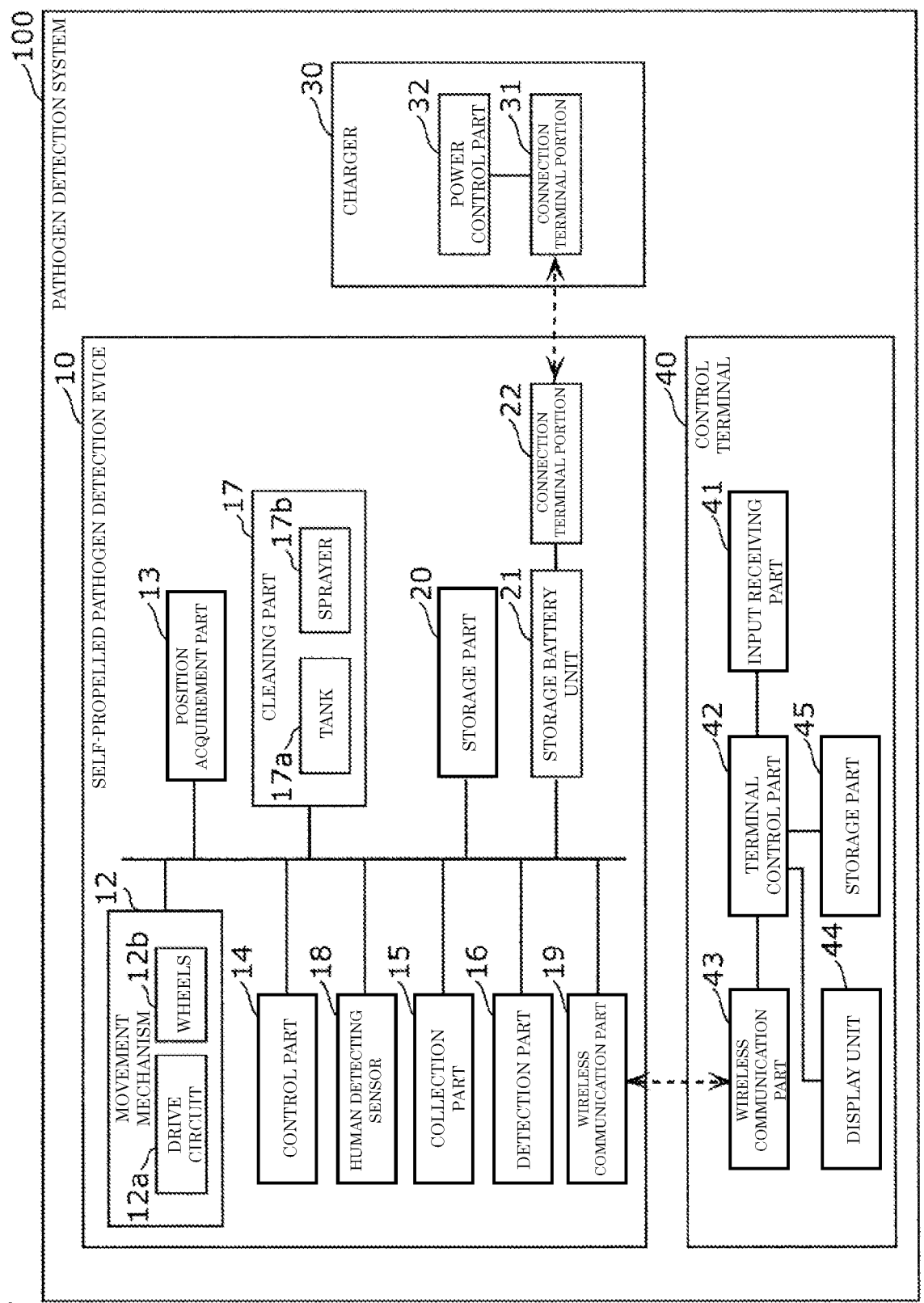
FIG. 3 is a block diagram illustrating a functional configuration of the pathogen detection system according to the embodiment.

Thereby, early detection of the pathogen is attained. The control terminal 40 is an information terminal for performing such a determination process of the target region. Hereinafter, the detailed configurations of the self-propelled pathogen detection device 10, the charger 30, and the control terminal 40 will be described with reference to FIG. 3 in addition to FIGS. 1 and 2. FIG. 3 is a block diagram showing a functional configuration of the pathogen detection system 100.

[Configuration of Self-Propelled Pathogen Detection Device]

First, the self-propelled pathogen detection device 10 will be described. As shown in FIGS. 1 to 3, the self-propelled pathogen detection device 10 comprises the housing 11 and a plurality of constituent elements provided in the housing 11. Specifically, the plurality of the constituent elements provided in the housing 11 are a movement mechanism 12, a position acquirement part 13, a control part 14, a collection part 15, a detection part 16, a cleaning part 17, a human detecting sensor 18, a wireless communication part 19, a storage part 20, a storage battery unit 21, and a connection terminal portion 22.

The housing 11 is a main body of the self-propelled pathogen detection device 10 in which each of constituent elements provided in the self-propelled pathogen detection device 10 is provided. The housing 11 has, for example, a flat cylindrical shape; however, the shape of the housing 11 is not particularly limited. The intake port 15a and the spray port 17c are provided on the upper surface of the housing 11. The exhaust port 15b is provided on the side surface of the housing 11.

The movement mechanism 12 moves the housing 11, namely, the self-propelled pathogen detection device 10. Specifically, the movement mechanism 12 comprises wheels 12b and a drive circuit 12a for driving the wheels 12b. The drive circuit 12a includes, for example, a motor for rotating the wheels 12b and a motor control circuit. The self-propelled pathogen detection device 10 comprises a pair of the wheels 12b, for example; however, the number of the wheels 12b is not specifically limited. The movement mechanism 12 allows the self-propelled pathogen detection device 10 to travel in a curve by adjusting the rotation speed of the pair of the wheels 12b.

The position acquirement part 13 acquires position information representing a current position of the housing 11 in the space. For example, the position acquirement part 13 is a sensor module for transmitting a wave such as invisible light (i.e., infrared rays), visible light, or ultrasonic waves to the periphery of the housing 11 and for receiving the wave reflected by a wall that defines the space. The position acquirement part 13 calculates and acquires position information on the basis of a position estimation algorithm using the received wave. The position information is, for example, two-dimensional coordinates in a top view in the space with the position of the charger 30 as the origin, and the position estimation algorithm is, for example, an algorithm for calculating the two-dimensional coordinates using the time from transmission of the wave to reception thereof. As a specific position estimation algorithm, for example, a data assimilation method such as a Kalman filter or a particle filter is used.

The position acquirement part 13 is not limited to a configuration in which the position acquirement part 13 itself calculates and acquires the position information. The position acquirement part 13 may acquire the position information from the outside of the self-propelled pathogen detection device 10. In this case, the position acquirement part 13 is realized by a wireless communication circuit. In other words, the wireless communication circuit is a wireless communication module.

The control part 14 controls the movement mechanism 12 on the basis of a control command received from the control terminal 40 by the wireless communication part 19. Thereby, the self-propelled pathogen detection device 10 moves in the space. The control part 14 also controls the position acquirement part 13, the collection part 15, the detection part 16, the cleaning part 17, the human detecting sensor 18, the wireless communication part 19, and the storage battery unit 21. The control part 14 is realized by a microcomputer, for example; however, may be realized by a processor or a dedicated circuit.

The collection part 15 sucks and collects fine particles floating in the air. Specifically, the collection part 15 has, for example, an intake fan or pump, and collects the fine particles in the air sucked from the intake port 15a.

The detection part 16 detects a pathogen. For example, the detection part 16 detects the pathogen when the housing 11 is present in the target region. The detection part 16 is, for example, a sensor for detecting the pathogen in the fine particles collected by the collection part 15 using a detection technique of a floating virus using a surface-enhanced Raman scattering phenomenon described in Patent Literature 2. In addition, the detection part 16 can also detect the concentration of the pathogen.

In the self-propelled pathogen detection device 10, the collection part 15 and the detection part 16 detect whether or not the pathogen is contained in the fine particles floating in the air. The detection part 16 may detect whether or not the pathogen is contained in the fine particles attached to a floor surface. In this case, the collection part 15 is not necessary, and a light detection method such as a fluorescent fingerprint may be used as a detection method by the detection part 16.

The cleaning part 17 performs a cleaning treatment for deactivating the pathogen. Specifically, the cleaning part 17 comprises a tank 17a for storing a hypochlorous acid aqueous solution, and a sprayer 17b for spraying the hypochlorous acid aqueous solution stored in the tank 17a in a mist form. In other words, the cleaning part 17 performs a process of spraying the hypochlorous acid aqueous solution as the cleaning treatment. The hypochlorous acid aqueous solution is discharged from the spray port 17c. The spray port 17c is provided on the upper surface of the housing 11; however, may be provided on the lower surface of the housing 11. In this case, the cleaning part 17 mainly purifies the floor surface of the space. The cleaning part 17 may deactivate the pathogen by a method other than spraying the hypochlorous acid aqueous solution.

The human detecting sensor 18 detects the presence or absence of a person. The human detecting sensor 18 detects the presence or absence of the person when the housing 11 is moving in the space, for example. The human detecting sensor 18 is, for example, an infrared sensor for detecting the presence or absence of the person on the basis of a change in the amount of infrared light; however, may be a sensor for detecting the presence or absence of the person on the basis of ultrasonic waves. The human detecting sensor 18 is used to generate person detection position information in the space.

The wireless communication part 19 is one example of a first wireless communication part, and is a wireless communication circuit for the self-propelled pathogen detection device 10 to perform wireless communication with the control terminal 40. In other words, the wireless communication circuit is a wireless communication module. For example, the wireless communication part 19 performs radio wave communication with the wireless communication part 43 of the control terminal 40; however, may perform optical communication such as infrared communication. The communication standard when the wireless communication part 19 performs radio wave communication is, for example, Bluetooth (registered trademark) or Wi-Fi (registered trademark); however, is not particularly limited.

The storage part 20 is a storage device for storing a control program of the control part 14. The storage part 20 is realized by, for example, a semiconductor memory.

The storage battery unit 21 is a power supply part of the self-propelled pathogen detection device 10. The storage battery unit 21 includes, for example, a storage battery such as a lithium ion battery, a charging circuit, and a discharging circuit. The self-propelled pathogen detection device 10 can move in self-propelled way in the room, as long as the storage battery has battery power.

The connection terminal portion 22 is a terminal structure for connecting the self-propelled pathogen detection device 10 to the charger 30. For example, the connection terminal portion 22 is exposed to the outside from the housing 11. The storage battery unit 21 can be supplied with electric power for charging the storage battery from the charger 30 via the connection terminal portion 22 by connecting the connection terminal portion 22 to the connection terminal portion 31 of the charger 30.

[Configuration of Charger]

The charger 30 is a device for charging the storage battery in the storage battery unit 21. The charger 30 comprises a connection terminal portion 31 and a power control part 32.

The connection terminal portion 31 is a terminal structure for connecting the self-propelled pathogen detection device 10 to the charger 30. The charger 30 can supply electric power to the self-propelled pathogen detection device 10 via the connection terminal portion 31 by connecting the connection terminal portion 31 to the connection terminal portion 22 of the self-propelled pathogen detection device 10.

The power control part 32 is a control device for controlling the supply of electric power to the self-propelled pathogen detection device 10 via the connection terminal portion 31. The power control part 32 is realized by, for example, a circuit for converting AC power provided from an electric power system into DC power suitable for charging the storage battery of the storage battery unit 21. The power control part 32 may include a microcomputer or a processor.

[Configuration of Control Terminal]

The control terminal 40 is an information terminal for controlling the self-propelled pathogen detection device 10. For example, the control terminal 40 is a portable terminal dedicated to the pathogen detection system 100; however, may be a general-purpose portable terminal such as a smartphone or a tablet terminal, or a general-purpose stationary terminal such as a personal computer. If the control terminal 40 is a general-purpose terminal, a dedicated application for controlling the self-propelled pathogen detection device 10 is installed in the general-purpose terminal. Specifically, the control terminal 40 comprises an input receiving part 41, a terminal control part 42, a wireless communication part 43, a display unit 44, and a storage part 45.

The input receiving part 41 receives user input. The input receiving part 41 is specifically a touch panel; however, may be a hardware key.

The terminal control part 42 controls the wireless communication part 43 and the display unit 44 in accordance with the user input received by the input receiving part 41. The terminal control part 42 is realized by a microcomputer, for example; however, may be realized by a processor or a dedicated circuit.

The wireless communication part 43 is one example of a second wireless communication part, and is a wireless communication circuit for the control terminal 40 to perform wireless communication with the self-propelled pathogen detection device 10. In other words, the wireless communication circuit is a wireless communication module. For example, the wireless communication part 43 performs radio wave communication with the control terminal 40; however, may perform optical communication such as infrared communication. The communication standard when the wireless communication part 43 performs radio wave communication is, for example, Bluetooth (registered trademark) or Wi-Fi (registered trademark); however, is not particularly limited.

For example, the wireless communication part 43 transmits a control command to the wireless communication part 19 of the self-propelled pathogen detection device 10 on the basis of the control of the terminal control part 42. In addition, the wireless communication part 43 receives, from the wireless communication part 19 of the self-propelled pathogen detection device 10, position information representing the current position of the self-propelled pathogen detection device 10, the remaining amount of the electricity stored in the storage battery, and the concentration of the pathogen appropriately.

The display unit 44 displays an image on the basis of the control of the terminal control part 42. The display unit 44 is realized by a display panel such as a liquid crystal panel or an organic EL panel.

The display unit 44 displays various kinds of information such as the position information, the remaining amount of the electricity stored in the storage battery, and the concentration of the pathogen, which have been received by the wireless communication part 43 from the self-propelled pathogen detection device 10. Thereby, the user can recognize the position of the self-propelled pathogen detection device 10, and the state of the space. If the various kinds of the information are transmitted in real time by the wireless communication part 19 and displayed by the display unit 44, the user can recognize the position of the self-propelled pathogen detection device 10 and the state of the space in real time.

The storage part 45 is a storage device for storing a control program of the terminal control part 42. The storage part 45 also stores the various kinds of the information received by the wireless communication part 43. The storage part 45 is realized by, for example, a semiconductor memory.

[Determination Operation of Target Region]

Figure 4:
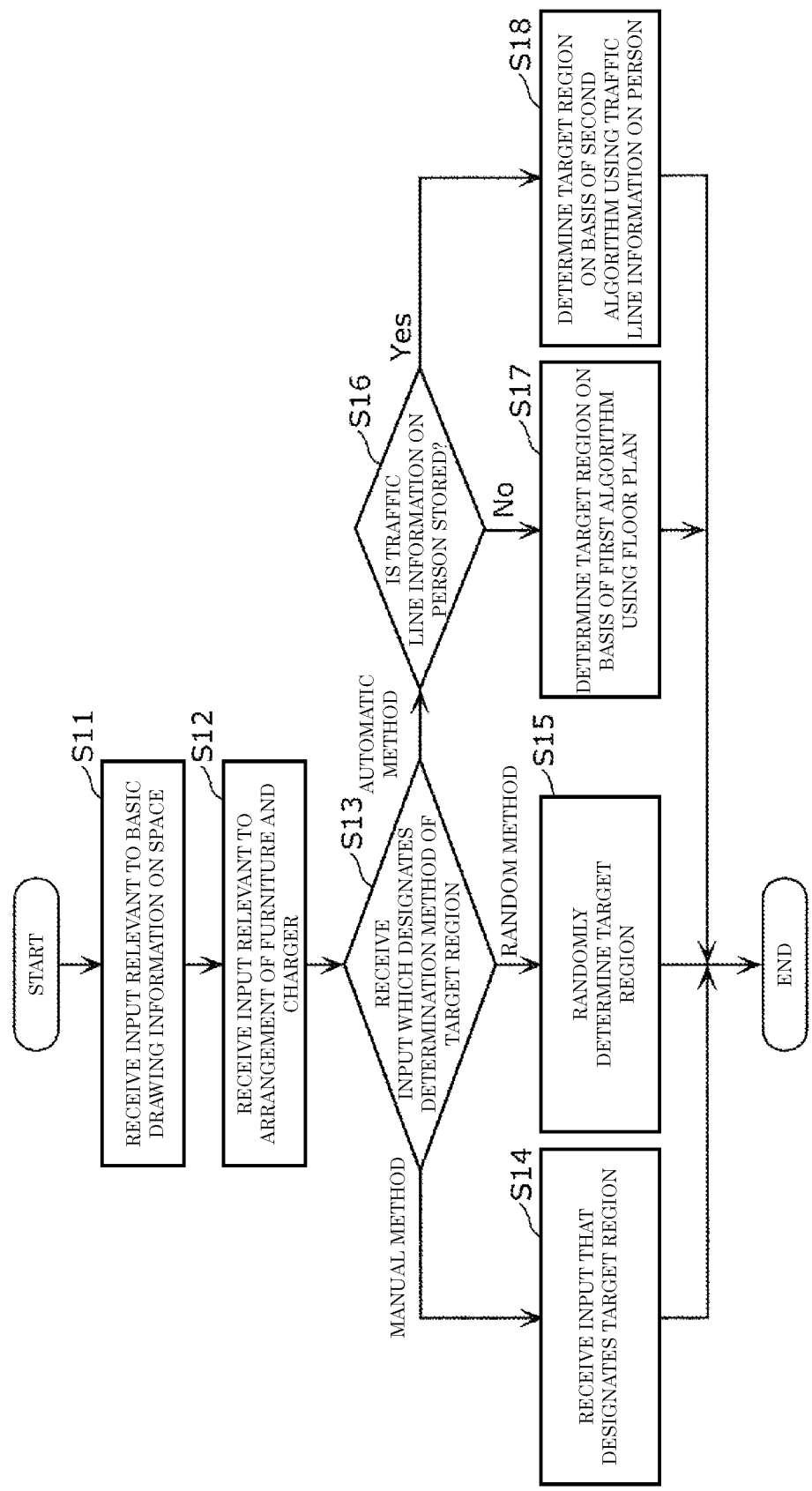
FIG. 4 is a flowchart of determination operation of a target region.

As described above, the pathogen detection system 100 can move the target region in the space and detect the pathogen in the target region. Here, the determination operation of the target region in the pathogen detection system 100 will be described. FIG. 4 is a flowchart of the determination operation of the target region.

First, the input receiving part 41 of the control terminal 40 receives an input relevant to basic drawing information on the space from the user (S11). The basic drawing information is, for example, the floor plan information on the space, and the input relevant to the basic drawing information is, for example, an input that instructs reading of the floor plan information on the space.

Figure 5:
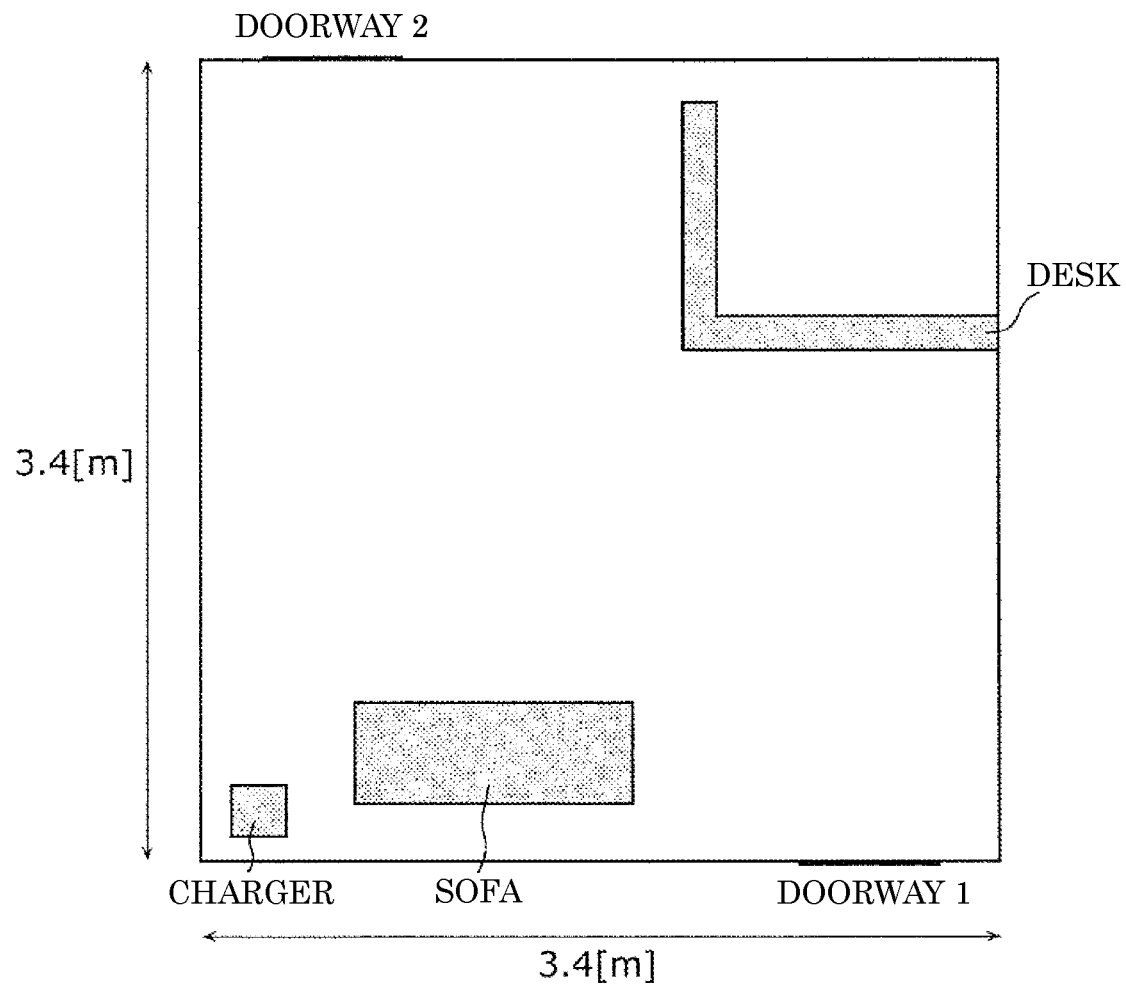
FIG. 5 is one example of a floor plan in which furniture has been arranged.

Next, the input receiving part 41 receives the input relevant to arrangement of furniture and a charger (S12). For example, the user sets boundary conditions such as a doorway of a room and a door in the floor plan read in the step S11 through the input receiving part 41. In addition, the user arranges icons such as a sofa, a desk, and a charger on the floor plan read in the step S11. FIG. 5 is one example of the floor plan in which furniture has been arranged.

In the example of FIG. 5, the space shown by the floor plan is a region of about 6 tatami mats of 3.4 [m]×3.4 [m]. In the floor plan, a doorway 1 and a doorway 2 have been set. A sofa, a desk and a charger have been arranged on the floor plan.

Next, the input receiving part 41 receives the input which designates a determination method of the target region (S13). In the pathogen detection system 100, as one example, the user can select one of three methods: a manual method, a random method, and an automatic method.

If an input that designates the manual method is received by the input receiving part 41 (manual method in S13), the user can designates a desired region on the floor plan shown in FIG. 5 as the target region. In this case, the input receiving part 41 further receives an input by the user that designates the target region (S14).

If an input that designates the random method is received by the input receiving part 41 (random method in S13), the terminal control part 42 randomly determines the target region (S15). For example, the terminal control part 42 causes the charger 30 to randomly generate a route such that the self-propelled pathogen detection device 10 can return within a predetermined time, and sets the route as the target region.

If an input that designates the automatic method is received by the input receiving part 41 (automatic method in S13), the terminal control part 42 determines whether or not the traffic line information on the person in the space has been stored in the storage part 45 with reference to the storage part 45 (S16).

Figure 6:
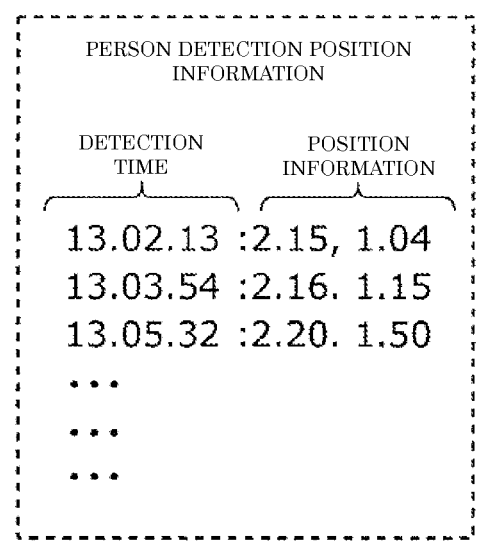
FIG. 6 is a diagram illustrating one example of person detection position information.

The traffic line information on the person is position information on the self-propelled pathogen detection device 10 when the presence of the person has been detected by the human detecting sensor 18 of the self-propelled pathogen detection device 10. The traffic line information on the person is generated on the basis of the person detection position information. FIG. 6 is a diagram illustrating one example of the person detection position information. The self-propelled pathogen detection device 10 performs the operation of a person detection position specifying mode in which the self-propelled pathogen detection device 10 moves everywhere from corner to corner of the space at a predetermined frequency such as once a day. If the presence of the person is detected by the human detecting sensor 18 during the movement of the self-propelled pathogen detection device 10, as shown in FIG. 6, the control part 14 of the self-propelled pathogen detection device 10 stores the position information representing the timing when the presence of the person has been detected and the current position of the self-propelled pathogen detection device 10 at the timing in the storage part 20 as person detection position information. The position information is, for example, two-dimensional coordinates with the position of the charger 30 as the origin, and the position acquirement part 13 calibrates the two-dimensional coordinates calculated when the self-propelled pathogen detection device 10 is connected to the charger 30 to 0, for example. The control part 14 causes the wireless communication part 19 to integrally transmit the person detection position information provided during the operation, for example, when the operation of the person detection position specifying mode ends or when a request for the person detection position information is received.

Figure 7:
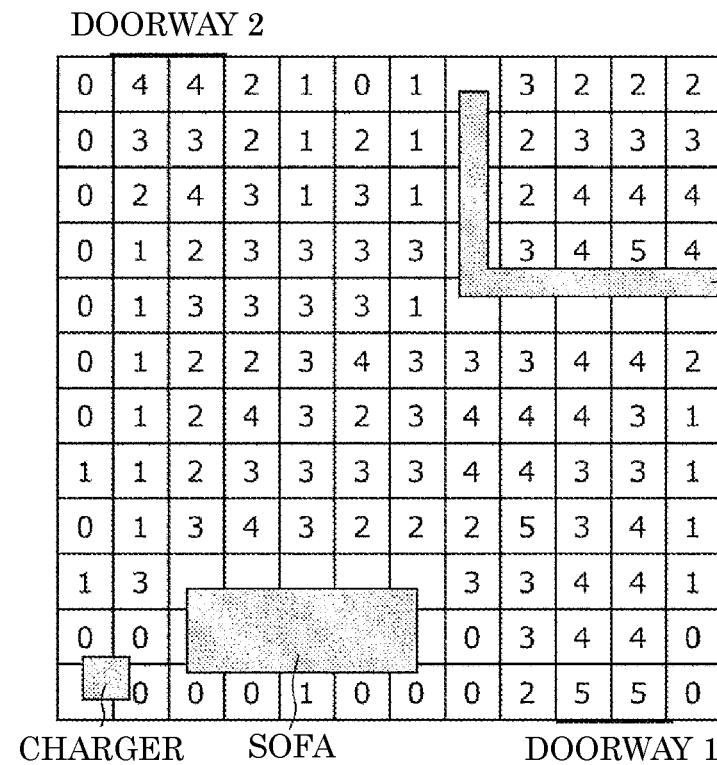
FIG. 7 is a diagram conceptually illustrating traffic line information on a person.

The person detection position information is received by the wireless communication part 43 of the control terminal 40 and stored in the storage part 45. The terminal control part 42 generates the traffic line information on the person, using such person detection position information. FIG. 7 is a diagram conceptually showing the traffic line information on the person.

For example, the traffic line information on the person is information representing the number of the times that the presence of the person has been detected by the human detecting sensor 18 in each of a plurality of meshes, when the space is divided into the plurality of the meshes. A mesh is one example of a unit region. As shown in FIG. 7, the mesh is, for example, one region when the space is divided into a matrix. The terminal control part 42 adds up the number of the times that the person has been detected for each mesh with reference to the person detection position information. The numbers in the mesh shown in FIG. 7 represent the number of the times that the person has been detected in the mesh.

Such traffic line information on the person is stored in the storage part 45. However, for example, no traffic line information on the person is stored in the storage part 45 during initial operation of the self-propelled pathogen detection device 10. In such a case (No in S16), the terminal control part 42 does not use the traffic line information on the person and determines the target region on the basis of the first algorithm using the floor plan provided after the furniture has been arranged in the step S12 (S17). On the other hand, if the traffic line information on the person is stored in the storage part 45 (Yes in S16), the terminal control part 42 determines the target region on the basis of the second algorithm using the traffic line information on the person (S18).

[Determination of Target Region Based on First Algorithm]

Figure 8:
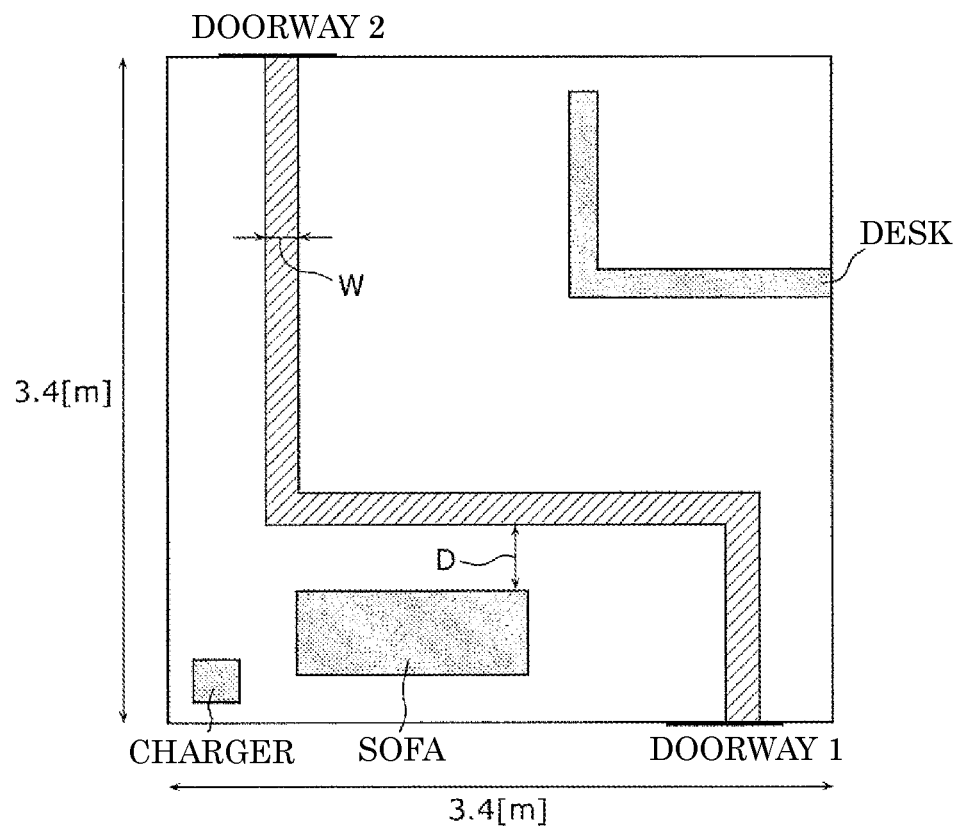
FIG. 8 is a diagram illustrating the target region determined by a determination method of the target region on the basis of a first algorithm.

Next, a determination method of the target region on the basis of the first algorithm will be described. FIG. 8 is a diagram illustrating the target region determined by the determination method of the target region on the basis of the first algorithm.

First, the terminal control part 42 determines a polygonal-line target region connecting the doorway 1 and the doorway 2 of the space input by the user in the space. This polygonal-line line target region is composed of a plurality of linear regions. The polygonal-line target region has a predetermined width W and is configured such that the end of the polygonal-line region is separated from an obstacle such as furniture arranged in the space by a predetermined distance D or more. The predetermined distance D is, for example, about 30 cm. Such a configuration is based on the assumption that pathogens are also excreted at some distance from the obstacle, since people come and go a little away from the obstacle rather than very close. Note that the predetermined width and the predetermined distance may be changeable, depending on an input by the user received by the input receiving part 41.

FIG. 8 is one example. In the example of FIG. 8, since there is one set of doorways, one target region is provided. However, if there are three or more doorways, the terminal control part 42 determines the polygonal-line target region for each of the combinations of any two doorways selected from the three or more doorways in a similar manner.

[Determination of Target Region Based on Second Algorithm]

Figure 9:
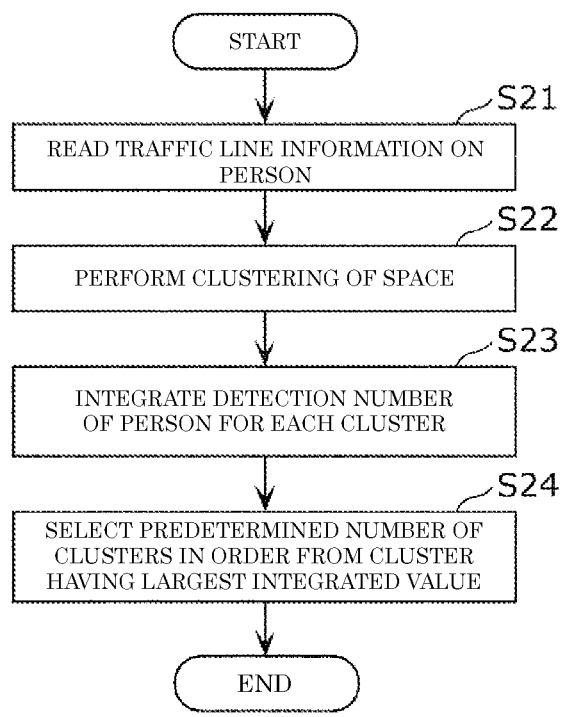
FIG. 9 is a flowchart of a determination method of the target region on the basis of a second algorithm.

Next, a determination method of the target region on the basis of the second algorithm will be described. FIG. 9 is a flowchart of a determination method of the target region on the basis of the second algorithm.

First, the terminal control part 42 reads the traffic line information on the person stored in the storage part 45 (S21). As described with reference to FIG. 7, the terminal control part 42 uses, as the traffic line information on the person, for example, the number of the times that the presence of the person has been detected by the human detecting sensor 18 in each of the plurality of the meshes when the space has been divided into the plurality of the meshes.

Next, the terminal control part 42 performs clustering of the space on the basis of the read traffic line information on the person (S22). Specifically, the terminal control part 42 performs the clustering of the space on the basis of the detection number of the person in each mesh determined by the read traffic line information on the person. The terminal control part 42 performs clustering of the space, using, for example, a k-means. For example, if clustering is performed with k=6, the space is clustered into six clusters. If the k-means is used, for example, k=approximately 3 to 6. k may be changeable in accordance with the user input received by the input receiving part 41.

Figure 10:
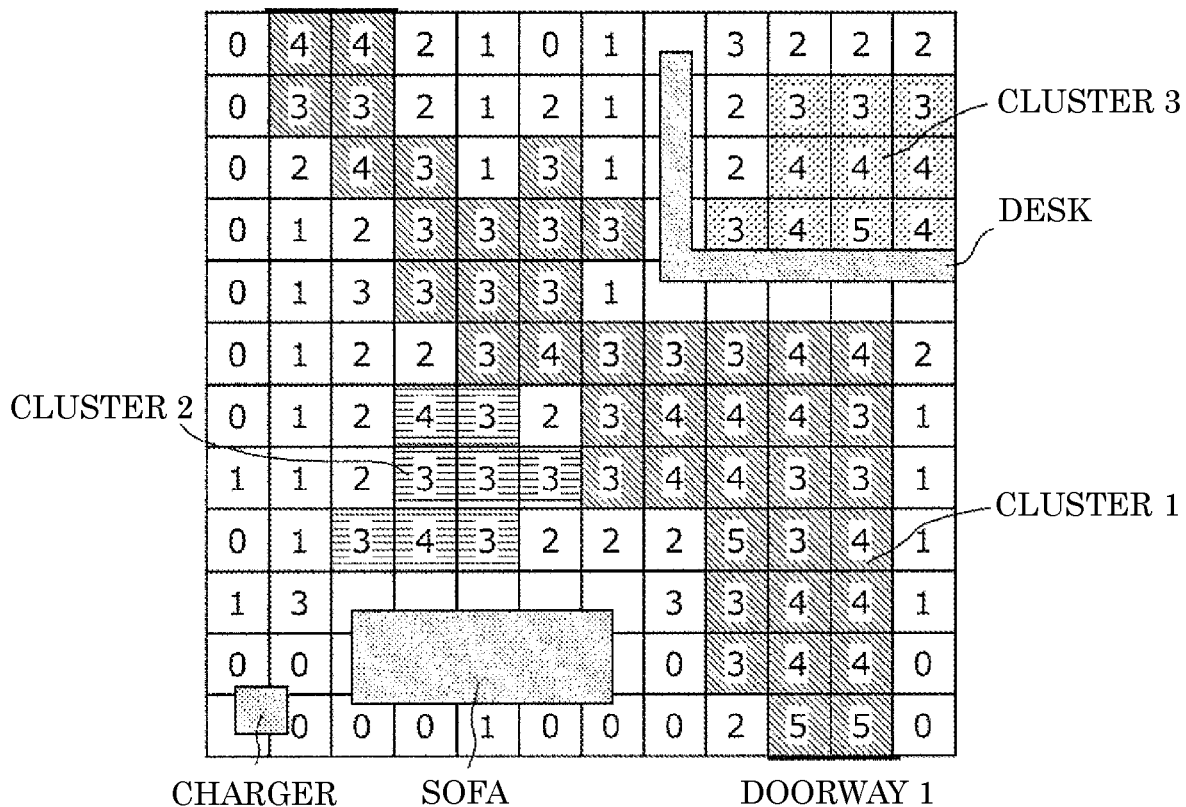
FIG. 10 is a diagram illustrating three clusters determined as the target regions.

Next, the terminal control part 42 integrates the detection number of the person in one or more meshes included in the cluster for each cluster (S23). In other words, the integration is numerical integration. Then, the terminal control part 42 selects a predetermined number n (n<k) of clusters in order from the cluster having the largest integrated value (S24), and determines the selected predetermined number n of the clusters as the target region (S24). For example, a predetermined number of clusters may be selected in order from the cluster having the largest area. FIG. 10 is a diagram illustrating three clusters determined as the target regions. A region provided by combining the cluster 1, the cluster 2, and the cluster 3, all of which are shown in FIG. 10, is the target region.

According to the determination method of the target region on the basis of the second algorithm as described above, the terminal control part 42 can more preferentially select, as the target region, meshes that have a greater number of times that the presence of a person has been detected by the human detecting sensor 18. In other words, the self-propelled pathogen detection device 10 can detect the pathogen, using the region where people are often present as the target region on the basis of the traffic line information on the person. The region where t people are often present is, in other words, a region where the pathogen discharged from people are often present. Therefore, the self-propelled pathogen detection device 10 can preferentially select, as the target region of the detection, a place where the pathogen is highly likely to be present in the space.

Note that another algorithm may be used as the second algorithm. For example, the terminal control part 42 may select, as the target region, a mesh in which the number of the times that the presence of the person has been detected by the human detecting sensor 18 is a predetermined number or more. In other words, the terminal control part 42 may exclude, from the target region, meshes in which the number of the times that the presence of the person has been detected by the human detecting sensor 18 is less than the predetermined number. Even with such an algorithm, the terminal control part 42 can more preferentially select, as the target region, meshes that have a greater number of times that the presence of a person has been detected by the human detecting sensor 18.

[Pathogen Detection Operation]

Figure 11:
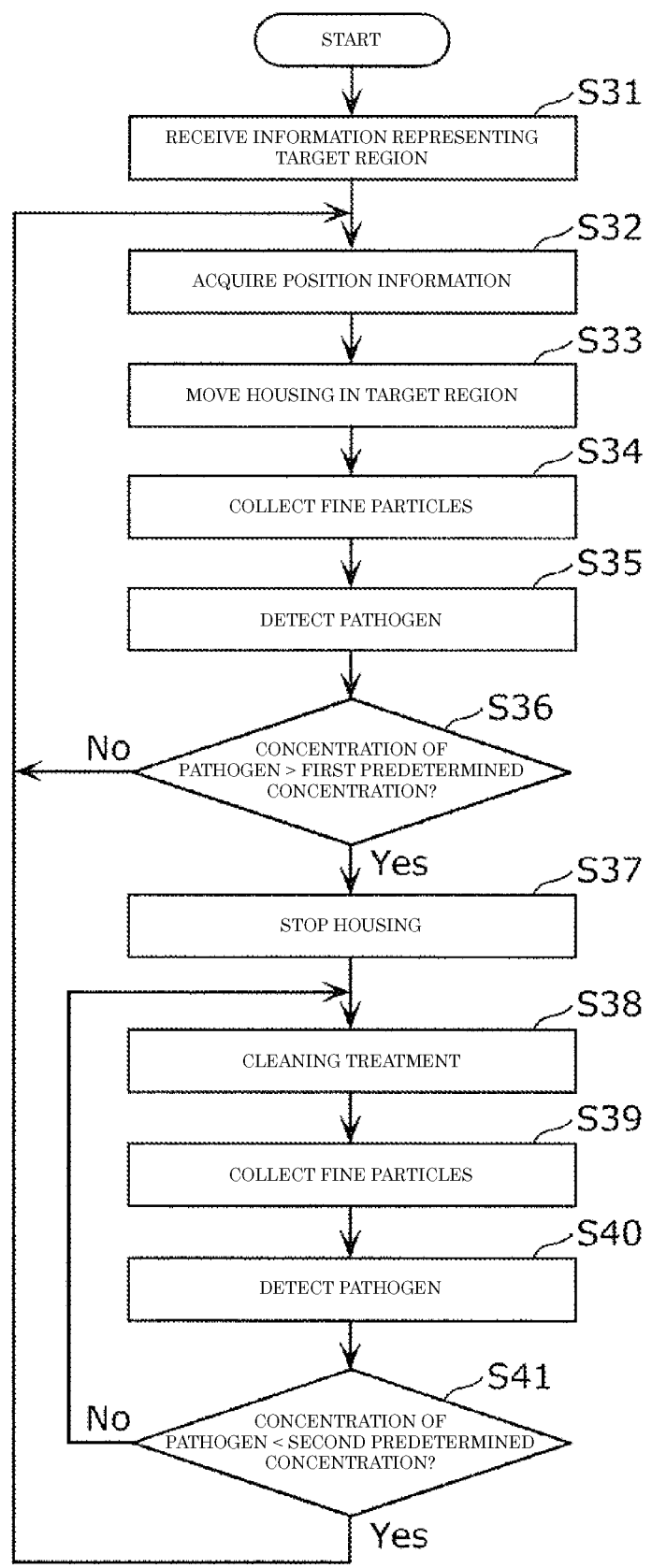
FIG. 11 is a flowchart of detection operation of a pathogen.

After the target region is determined by any of the above-described methods, the self-propelled pathogen detection device 10 starts detection operation of the pathogen. FIG. 11 is a flowchart of the detection operation of the pathogen.

First, the wireless communication part 19 of the self-propelled pathogen detection device 10 receives information representing the target region from the wireless communication part 43 of the control terminal 40 (S31). In the information representing the target region, for example, the target region is represented by two-dimensional coordinates with the position of the charger 30 as the origin. The received information representing the target region is stored in the storage part 20, for example.

Next, the position acquirement part 13 acquires position information representing the current position of the housing 11 in the space (S32). The control part 14 controls the movement mechanism 12 on the basis of the position information to move the housing 11 in the target region determined for the housing 11 (S33). Specifically, the control part 14 moves the housing 11 within a range in which the coordinates represented by the position information acquired by the position acquirement part 13 is in the target region.

In the example of FIG. 10 described above, the target region and the position of the charger 30 are not continuous and are not connected to each other. When the position of the charger 30 is a movement start point of the self-propelled pathogen detection device 10, it is preferable that the self-propelled pathogen detection device 10 goes to the mesh which is in the shortest distance from the position of the charger 30 in the target region. In addition, if there are a plurality of the meshes which are in the shortest distance from the position of the charger 30 in the target region, the mesh in which the detection number of the person is large is selected preferentially from the plurality of the mesh. Further, if two or more meshes have the same detection number of the person as each other, the mesh identified in advance may be selected preferentially.

As just described, when the housing 11 is moving in the target region, the collection part 15 collects the fine particles in the air (S34), and the detection part 16 detects a pathogen, using the collected fine particles as a target (S35). Note that the collection of the fine particles in the step S34 may be performed while the housing 11 is moving, or may be performed in a state where the housing 11 is stopped.

Next, the control part 14 determines whether or not the concentration of the detected pathogen exceeds a first predetermined concentration (S36). If the concentration of the detected pathogen is equal to or lower than the first predetermined concentration (No in S36), the movement in the target region is continued (S33), while acquiring the position information (S32).

On the other hand, if the concentration of the detected pathogen exceeds the first predetermined concentration (Yes in S36), the control part 14 stops the housing 11 at a pathogen detection position where the pathogen has been detected by the detection part 16 (S37). The cleaning part 17 performs the cleaning treatment in the state stopped at the pathogen detection position on the basis of the control of the control part 14 (S38). Specifically, the cleaning part 17 performs the process in which the hypochlorous acid aqueous solution is sprayed as the cleaning treatment. The cleaning treatment in the step S37 may be performed during the movement.

The collection part 15 collects fine particles in the air during or after the cleaning treatment (S39), and the detection part 16 detects the pathogen in the collected fine particles (S40). Further, the control part 14 determines whether or not the concentration of the detected pathogen is less than a second predetermined concentration (S41). For example, the second predetermined concentration is lower than the first predetermined concentration; however, may be equal to the first predetermined concentration.

If the concentration of the detected pathogen is equal to or higher than the second predetermined concentration (No in S41), the cleaning treatment is continued (S38). On the other hand, if the concentration of the detected pathogen is less than the second predetermined concentration (Yes in S41), the cleaning treatment at the pathogen detection position is completed. The control part 14 moves the housing 11 again in the target region (S33), while acquiring the position information (S32). In other words, the cleaning part 17 continues the cleaning treatment until the concentration of the pathogen detected by the detection part 16 is lower than the second predetermined concentration, and the control part 14 controls the movement mechanism 12 to cause the housing 11 to move from the pathogen detection position, if the concentration of the pathogen detected by the detection part 16 is lower than the second predetermined concentration.

If the concentration of the hypochlorous acid aqueous solution stored in the tank 17a is known, the control part 14 can calculate a CT value on the basis of the concentration of the hypochlorous acid aqueous solution, and calculate a spraying time of the hypochlorous acid aqueous solution required for deactivation of the pathogen from the calculated CT value. In this case, the step S39 and the step S40 are omitted, and it may be determined whether or not the spraying time has elapsed in the step S41.

[Specific Example of Cleaning Treatment]

Figure 12:
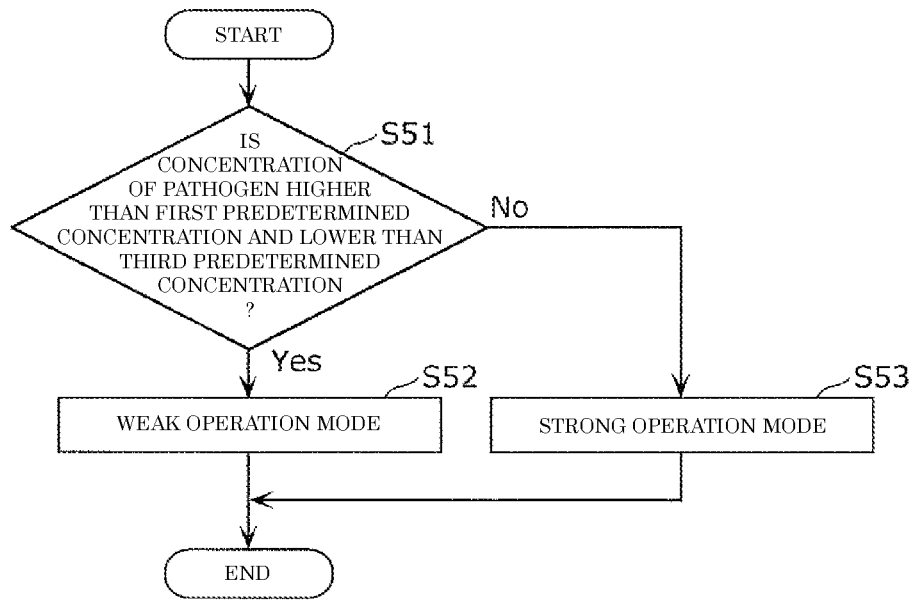
FIG. 12 is a flowchart of a specific example of a cleaning treatment.

The cleaning part 17 may change the content of the cleaning treatment, depending on the concentration of the detected pathogen. FIG. 12 is a flowchart of a specific example of such a cleaning treatment. FIG. 12 shows specific processing performed in the step S37 of FIG. 11.

The control part 14 determines whether or not the concentration of the pathogen is higher than the first predetermined concentration and lower than a third predetermined concentration (S51). The third predetermined concentration is higher than the first predetermined concentration. If the concentration of the pathogen is higher than the first predetermined concentration and equal to or lower than the third predetermined concentration (Yes in S51), the cleaning part 17 performs the cleaning treatment in a weak operation mode on the basis of the control of the control part 14 (S52). On the other hand, if the concentration of the pathogen is higher than the third predetermined concentration (No in S51), the cleaning part 17 performs the cleaning treatment in a strong operation mode on the basis of the control of the control part 14 (S52).

In the strong operation mode, for example, the amount of the hypochlorous acid aqueous solution which is sprayed per unit time is larger than that in the weak operation mode. Therefore, even if the concentration of the pathogen is high, the pathogen can be deactivated in a short time. The spraying time of the hypochlorous acid aqueous solution in the strong operation mode may be different from that in the weak operation mode. Specifically, in the strong operation mode, the hypochlorous acid aqueous solution may be sprayed for a longer time than in the weak operation mode.

In FIG. 12, the content of the cleaning treatment is changed in two stages. However, the content of the cleaning treatment may be changed in three stages, for example, a weak operation mode, a middle operation mode, and a strong operation mode. It may be finely changed to four or more stages.

[Update of Traffic Line Information on Person]

Figure 13:
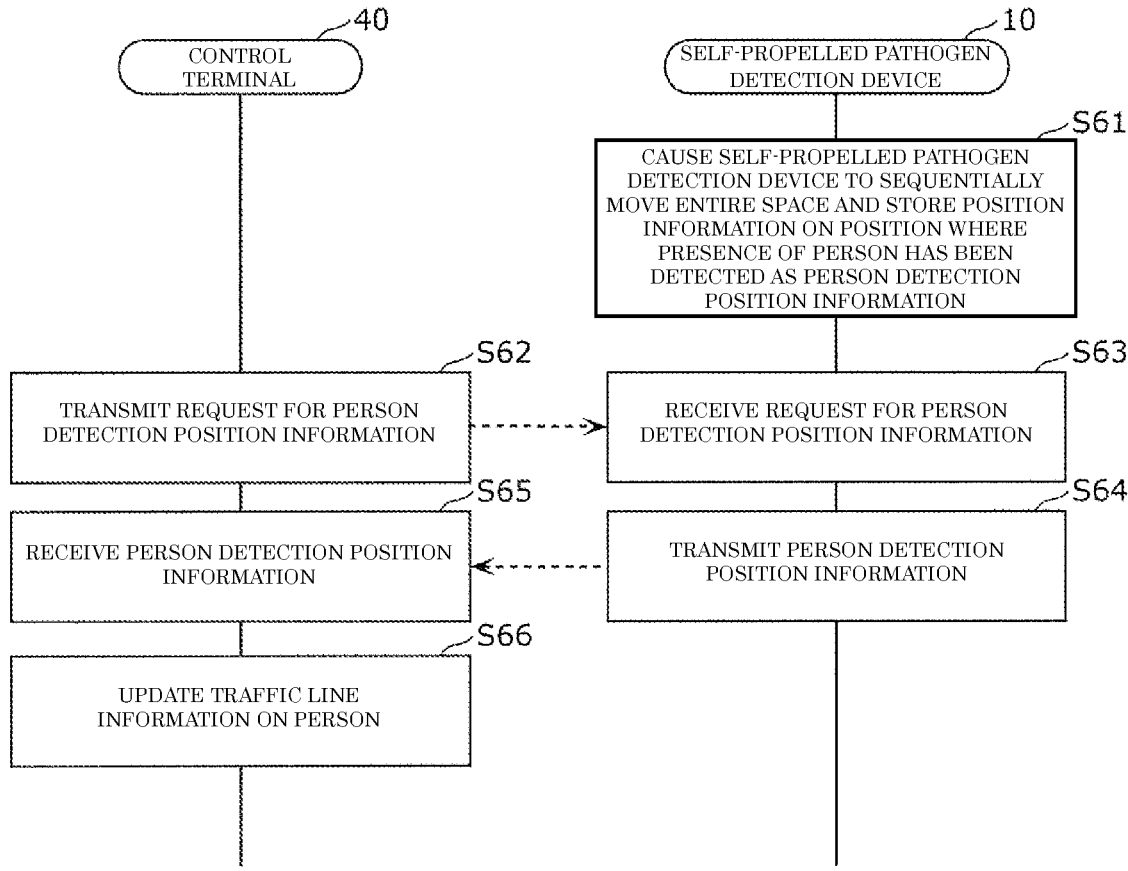
FIG. 13 is a sequence diagram of update operation of the target region.

As described above, the traffic line information on the person is updated on the basis of the person detection position information provided as a result of the operation of the person detection position specifying mode performed at a predetermined frequency such as once a day. FIG. 13 is a sequence diagram of update operation of the target region.

First, the self-propelled pathogen detection device 10 performs the operation of the person detection position specifying mode (S61). The control part 14 of the self-propelled pathogen detection device 10 controls the movement mechanism 12 to cause the self-propelled pathogen detection device 10 to sequentially move in the entire space. Then, if the presence of the person is detected during movement, the control part 14 stores the position information on the position where the presence of the person has been detected in the storage part 20 as the person detection position information. The position information is acquired by the position acquirement part 13.

Thereafter, the terminal control part 42 of the control terminal 40 transmits a request for the person detection position information to the wireless communication part 43 on the basis of the user input received by the input receiving part 41 (S62). The request for the person detection position information may be transmitted periodically.

The wireless communication part 19 of the self-propelled pathogen detection device 10 receives the request for the person detection position information (S63). It is preferable that the request for the person detection position information is included in, for example, the control command that instructs the start of the detection operation of the pathogen. In response to the received request for the person detection position information, the control part 14 reads the person detection position information stored in the storage part 20 in the step S61, and causes the wireless communication part 19 to transmit the read person detection position information (S64). The person detection position information may be transmitted spontaneously from the self-propelled pathogen detection device 10. For example, the control part 14 may cause the wireless communication part 19 to periodically transmit the person detection position information.

The wireless communication part 43 of the control terminal 40 receives the person detection position information (S65). The terminal control part 42 updates the current traffic line information on the person stored in the storage part 45 on the basis of the person detection position information (S66). Specifically, the detection number of the person for each mesh in the person detection position information is added to the detection number of the person for each mesh in the current traffic line information on the person. If the determination operation of the target region shown in FIG. 9 is performed using such updated traffic line information on the person, the target region is updated.

As described above, if the traffic line information on the person is updated, the terminal control part 42 can adaptively change the target region, depending on the change in the person's life pattern. Therefore, the self-propelled pathogen detection device 10 can deactivate the pathogen efficiently by detecting the pathogen in the changed target region.

The traffic line information on the person may be updated at a time set by the user. Further, while the self-propelled pathogen detection device 10 is in operation, the traffic line information on the person may be updated on the basis of detection information of the person at the previous operation. In this case, while the self-propelled pathogen detection device 10 is in operation, the total number of the person detected in each operation time zone on the previous operation day is calculated by numerical integration over the mesh, and the traffic line information on the person is updated on the basis of the detection information on the person in the time zone having the highest detection number.

[Return Operation to Charger]

Figure 14:
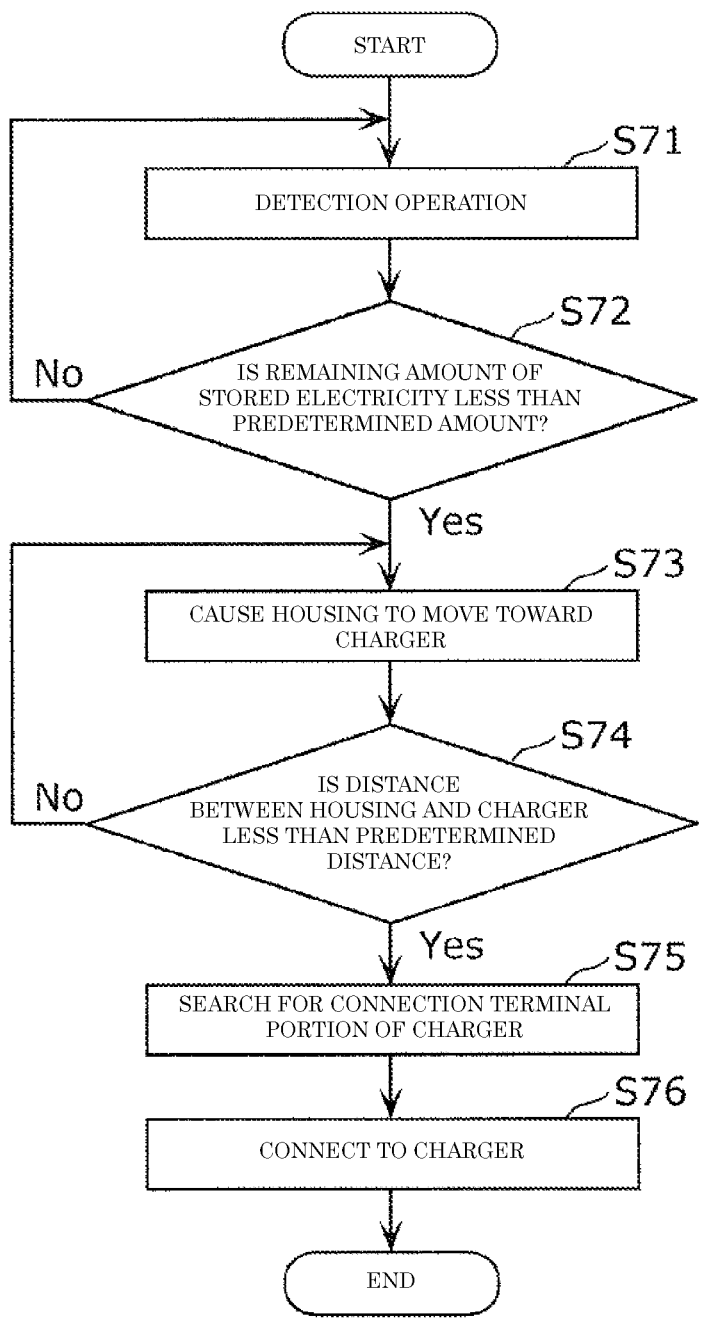
FIG. 14 is a flowchart of return operation.

The self-propelled pathogen detection device 10 may perform return operation that the self-propelled pathogen detection device 10 automatically returns to the charger 30, if the remaining amount of the electricity stored in the storage battery of the storage battery unit 21 falls below a predetermined amount during the detection operation of the pathogen. FIG. 14 is a flowchart of the return operation.

During the detection operation of the pathogen of FIG. 9 (S71), the control part 14 monitors the remaining amount of the electricity stored in the storage battery of the storage battery unit 21, and determines whether or not the remaining amount of the stored electricity is less than a predetermined amount (S72). The predetermined amount is, for example, 10% of the maximum remaining amount of the stored electricity. If the control part 14 determines that the remaining amount of the stored electricity is equal to or greater than the predetermined amount (No in S72), the control part 14 continues the detection operation of the pathogen.

On the other hand, if the control part 14 determines that the remaining amount of the stored electricity is less than the predetermined amount (Yes at S72), the control part 14 controls the movement mechanism 12 to cause the housing 11 to move toward the charger 30 (S73). Then, the control part 14 determines whether or not the distance between the housing 11 and the charger 30 is less than a predetermined distance (S74).

If the control part 14 determines that the distance between the housing 11 and the charger 30 is equal to or greater than the predetermined distance (No in S74), the control part 14 continues the movement of the housing 11 toward the charger 30 (S73). On the other hand, if the control part 14 determines that the distance between the housing 11 and the charger 30 is less than the predetermined distance (Yes in S74), the control part 14 searches for the connection terminal portion 31 of the charger 30 (S75), and controls the movement mechanism 12 to cause the housing 11 to move in such a manner that the connection terminal portion 22 of the self-propelled pathogen detection device 10 is connected to the connection terminal portion 31. In this way, the self-propelled pathogen detection device 10 is connected to the charger 30 (S76).

According to the return operation as described above, it is possible to prevent the self-propelled pathogen detection device 10 from being stopped due to a shortage of the remaining amount of stored electricity.

[Variation]

In the above embodiment, the terminal control part 42 of the control terminal 40 determines the target region and updates the traffic line information on the person. However, the control part 14 of the self-propelled pathogen detection device 10 may determine the target region and update the traffic line information on the person. For example, in place of the terminal control part 42, the control part 14 may determine the target region in the space on the basis of the traffic line information on the person in the space, and may update the traffic line information on the person on the basis of the person detection position information. In this case, the control terminal mainly functions as a user interface, and the control part of the self-propelled pathogen detection device mainly performs various controls.

In the above embodiment, the detection operation of the pathogen is performed mainly by the control part 14 of the self-propelled pathogen detection device 10. However, the detection operation of the pathogen may be performed mainly by the terminal control part 42 of the control terminal 40. In this case, the terminal control part 42 of the control terminal 40 causes the wireless communication part 43 to appropriately transmit a control command. In this way, the terminal control part 42 operates the self-propelled pathogen detection device 10 in a dependent manner.

Other Embodiments

Although the pathogen detection system according to the embodiment has been described above, the present disclosure is not limited to the above embodiment.

For example, the space in which the pathogen detection system detects a pathogen is, for example, an indoor space such as a care facility, a hospital, or a waiting room of a hospital; however, may be other spaces. The space in which the pathogen detection system detects a pathogen may be an airport. The space in which the pathogen detection system detects a pathogen is not limited to a building, and may be a space in a vehicle such as a railroad or an airplane.

In addition, the pathogen which is a detection target of the pathogen detection system is not limited to a virus. For example, the pathogen may be, for example, mold or bacteria.

In addition, in the above embodiment, another process part may perform the process which a specific process part performs. Further, the order of the plurality of processes may be changed, and the plurality of processes may be executed in parallel.

In addition, in the above embodiment, the constituent element such as a control processing part may be configured by dedicated hardware or may be realized by executing a software program suitable for each constituent element. Each constituent element may be realized by a program execution part such as a CPU or a processor reading and executing a software program recorded on a recording medium such as a hard disk or a semiconductor memory.

The constituent element such as the control processing part may be circuits (or integrated circuits). These circuits may constitute one circuit as a whole, or may be individual circuits. Each of these circuits may be a general-purpose circuit or a dedicated circuit.

Moreover, the present disclosure may be realized as a control method of the self-propelled pathogen detection device performed by a computer, or a detection method of the pathogen, using the self-propelled pathogen detection device. The present disclosure may be realized as a program for causing a computer to execute these methods. The present disclosure may be realized as a computer-readable non-transitory recording medium in which the program is recorded.

In addition, the embodiments can be realized by various modifications to the embodiment conceived by those skilled in the art, or by arbitrarily combining the constituent elements and functions in the embodiment without departing from the gist of the present disclosure. Such embodiments are also included in the present disclosure.

INDUSTRIAL APPLICABILITY

The pathogen detection system of the present disclosure preferentially selects, as a target region of detection, a place where a pathogen is highly likely to be present in a space such as a facility. The pathogen detection system of the present disclosure can detect a pathogen early in an indoor space such as a care facility, a hospital, or a waiting room of a hospital.

Examples of the inventions derived from the above disclosure will be listed below.

1. A self-propelled pathogen detection device, comprising:
   a housing;
   a detection part for detecting a pathogen;
   a movement mechanism for moving the housing;

a position acquirement part for acquiring position information representing a current position of the housing in a space; and a control part, wherein the control part includes a processor and a storage part, and, in operation, (i) controls the movement mechanism to cause the housing to move on the basis of the position information acquired by the position acquirement part in at least one unit region selected as a target region from a plurality of unit regions in the space on the basis of traffic line information on a person in the space; and (ii) controls the detection part to detect the pathogen in the target region.

2. The self-propelled pathogen detection device according to Item 1, further comprising:

a human detecting sensor for detecting presence or absence of the person while the housing is moving in the space, wherein the traffic line information includes the number of persons detected by the human detecting sensor in each unit region.

3. The self-propelled pathogen detection device according to Item 2, wherein the control part selects more preferentially, as the target region, the unit regions that have a greater number of times that the presence of the person has been detected by the human detecting sensor.

4. The self-propelled pathogen detection device according to Item 2, wherein the control part stores the position information when the person is detected by the human detecting sensor in the storage part as person detection position information; and the traffic line information on the person is updated on the basis of the person detection position information.

5. The self-propelled pathogen detection device according to Item 1, further comprising:

a cleaning part for performing a cleaning treatment for deactivating the pathogen.

6. The self-propelled pathogen detection device according to Item 5, wherein the cleaning treatment is to spray a hypochlorous acid aqueous solution.

7. The self-propelled pathogen detection device according to Item 5, wherein the storage part stores a plurality of cleaning treatments;

the detection part detects a concentration of the pathogen detected by the detection part; and the control part selects at least one cleaning treatment from the plurality of the cleaning treatments in accordance with the concentration of the pathogen.

8. The self-propelled pathogen detection device according to Item 5, wherein when the pathogen is detected by the detection part, the control part controls the movement mechanism to stop the housing at a detection position where the pathogen has been detected by the detection part; and the cleaning part performs the cleaning treatment while stopped at the detection position.

9. The self-propelled pathogen detection device according to Item 5, wherein the cleaning part continues the cleaning treatment until a concentration of the pathogen detected by the detection part is lower than a predetermined concentration; and the control part controls the movement mechanism to move the housing from the detection position, when the concentration of the pathogen detected by the detection part is lower than the predetermined concentration.

10. A pathogen detection system comprising:

a self-propelled pathogen detection device; and a control terminal, wherein the self-propelled pathogen detection device comprises a housing;

a detection part for detecting a pathogen;

a movement mechanism for moving the housing;

a position acquirement part for acquiring position information representing a current position of the housing in a space, a control part for controlling the movement mechanism; and a first wireless communication part;

the control terminal comprises:

a terminal control part for selecting, as a target region, at least one unit region from a plurality of unit regions in the space on the basis of traffic line information on a person in the space; and a second wireless communication part for transmitting information representing the selected target region to the first wireless communication part;

the control part controls the movement mechanism on the basis of the position information to cause the housing to move in the selected target region represented by the information received by the first wireless communication; and the detection part detects the pathogen in the target region.

11. A control method for a self-propelled pathogen detection device, the method comprising:

acquiring position information representing a current position of the self-propelled pathogen detection device in a space, selecting, as a target region, at least one unit region from a plurality of unit regions in the space on the basis of traffic line information on a person in the space;

causing the self-propelled pathogen detection device to move in the selected target region on the basis of the position information; and causing the self-propelled pathogen detection device to detect a pathogen when the self-propelled pathogen detection device is present in the target region.

REFERENCE SIGNS LIST

10 Self-propelled pathogen detection device
11 Housing
12 Movement mechanism
12a Drive circuit
12b Wheels
13 Position acquirement part
14 Control part
15 Collection part
15a Intake port
15b Exhaust port
16 Detection part
17 Cleaning part
17a Tank
17b Sprayer
17c Spray port
18 Human detecting sensor
19, 43 Wireless communication part
20, 45 Storage part
21 Storage battery unit
22, 31 Connection terminal portion
30 Charger 32 Power control part
40 Control terminal
41 Input receiving part
42 Terminal control part
44 Display unit
100 Pathogen detection system

The invention claimed is:

1. A self-propelled pathogen detection device, comprising:
 a housing;
 a detection part for detecting a pathogen;
 a movement mechanism for moving the housing;
 a position acquirement part for acquiring position information representing a current position of the housing in a space;
 a cleaning part for conducting a cleaning treatment for deactivating the pathogen; and
 a control part, in operation, which
  determines a target region in the space on the basis of traffic line information on a person in the space; and
  controls the movement mechanism to move the housing in the target region on the basis of the position information,
 wherein the detection part, in operation, detects the pathogen in the target region, and detects a concentration of the pathogen, and
 the cleaning part, in operation, changes a content of the cleaning treatment, depending on the concentration of the detected pathogen.

2. The self-propelled pathogen detection device according to claim 1, further comprising:
 a human detecting sensor for detecting presence or absence of the person while the housing moves in the space,
 wherein the traffic line information on the person includes the number of times that the presence of the person has been detected by the human detecting sensor in each of a plurality of unit regions in a case where the space is divided into the plurality of the unit regions.

3. The self-propelled pathogen detection device according to claim 2, wherein
 the control part determines the target region according to a number of times that the presence of the person has been detected by the human detecting sensor.

4. The self-propelled pathogen detection device according to claim 2, further comprising:
 a storage part,
 wherein the control part stores, in the storage part, the position information when the presence of the person is detected with the human detecting sensor as person detection position information, and
 the control part updates the traffic line information on the person on the basis of the person detection position information.

5. The self-propelled pathogen detection device according to claim 1, wherein
 the cleaning treatment is to spray a hypochlorous acid aqueous solution.

6. The self-propelled pathogen detection device according to claim 1, wherein
 the control part controls the movement mechanism to stop the housing at a detection position where the pathogen has been detected by the detection part, and
 the cleaning part conducts the cleaning treatment in a state where the housing has stopped at the detection position.

7. The self-propelled pathogen detection device according to claim 6, wherein
 the cleaning part continues the cleaning treatment until a concentration of the pathogen detected by the detection part is lower than a predetermined concentration, and
 the control part controls the movement mechanism to cause the housing to move from the detection position, if the concentration of the pathogen detected by the detection part is lower than the predetermined concentration.

8. A pathogen detection system, comprising:
 a self-propelled pathogen detection device; and
 a control terminal;
 wherein
 the self-propelled pathogen detection device comprises:
  a housing;
  a detection part for detecting a pathogen;
  a movement mechanism for moving the housing;
  a position acquirement part for acquiring position information representing a current position of the housing in a space;
  a control part for controlling the movement mechanism;
  a cleaning part for conducting a cleaning treatment for deactivating the pathogen; and
  a first wireless communication part,
 the control terminal comprises:
  a terminal control part for determining a target region in the space on the basis of traffic line information on a person in the space; and
  a second wireless communication part for transmitting information representing the determined target region to the first wireless communication part,
 the control part controls the movement mechanism on the basis of the position information so as to move the housing in the target region identified by the information received by the first wireless communication part,
 the detection part detects the pathogen in the target region,
 the detection part further detects a concentration of the pathogen, and
 the cleaning part changes a content of the cleaning treatment, depending on the concentration of the detected pathogen.

9. A control method of a self-propelled pathogen detection device, the method comprising:
 acquiring position information representing a current position of the self-propelled pathogen detection device in a space;
 determining a target region in the space on the basis of traffic line information on a person in the space;
 moving the self-propelled pathogen detection device in the determined target region on the basis of the position information;
 causing the self-propelled pathogen detection device to detect the pathogen and a concentration of the pathogen, when the self-propelled pathogen detection device is present in the target region;
 conducting a cleaning treatment to the target region for deactivating the pathogen; and
 changing a content of the cleaning treatment, depending on the concentration of the detected pathogen.

10. A self-propelled pathogen detection device, comprising:
- a housing;
- a detection part for detecting a pathogen;
- a movement mechanism for moving the housing;
- a position acquirement part for acquiring position information representing a current position of the housing in a space;
- a cleaning part for conducting a cleaning treatment for deactivating the pathogen; and
- a control part, in operation, which controls the movement mechanism to move the housing on the basis of the position information,
- wherein the detection part, in operation, detects the pathogen, and detects a concentration of the pathogen, and
- the cleaning part, in operation, changes a content of the cleaning treatment, depending on the concentration of the detected pathogen.

* * * * *